United States Patent [19]
Mottes

[11] 3,884,067
[45] May 20, 1975

[54] TENSIOMETER

[76] Inventor: Yaacov Mottes, 35B Dizengoff Str., Natanya, Israel

[22] Filed: June 19, 1972

[21] Appl. No.: 264,370

[30] Foreign Application Priority Data
June 23, 1971 Israel...................... 37125

[52] U.S. Cl. ................................... 73/73
[51] Int. Cl. ......................... G01h 33/24
[58] Field of Search................ 73/73, 385

[56] References Cited
UNITED STATES PATENTS

| | | | |
|---|---|---|---|
| 756,905 | 4/1904 | Stoelting............... | 73/38 S |
| 2,801,538 | 8/1957 | Matson.................. | 73/73 |
| 3,043,133 | 7/1962 | Richards............... | 73/73 |
| 3,045,477 | 7/1962 | Matson.................. | 73/73 |
| 3,091,115 | 5/1963 | Roberts................. | 73/73 |
| 3,103,117 | 9/1963 | Richards............... | 73/73 |

Primary Examiner—Herbert Goldstein
Attorney, Agent, or Firm—Gilbert M. Goller

[57] ABSTRACT

An improved soil moisture tensiometer comprising a tubular housing having a porous cup attached to the bottom thereof and a mercury barometer disposed within said housing, wherein the housing is adatped to be filled with water and closed and the barometer is adapted to indicate the moisture content of the soil surrounding said cup.

1 Claim, 3 Drawing Figures

TENSIOMETER

BACKGROUND OF THE INVENTION

1. Field of the Invention

The present invention concerns tensiometers, i.e. instruments which are used to measure the moisture of the soil by measuring its tension, i.e. negative pressure. More particularly, it is directed to tensiometers utilizing barometers i.e. monometers which are sealed at one end, in a closed tubular housing filled with water and having a porous cup attached to the end thereof.

2. Description of the Prior Art

There are two types of constructions of tensiometers having mercury manometers in general use. One kind comprises a porous cup attached to the bottom of a short tubular housing filled with water into which extends one end of a narrow flexible tube. The other end of said flexible tube is filled with mercury and is attached to a calibrated manometer scale, the free end of which is tapered for easy insertion into the ground. In use, the porous cup is inserted into the ground to a depth at which the soil moisture is to be measured, and the scale likewise is attached to the ground, whereby the flexible tube assumes an inverted U-shape.

While from a scientific view-point this kind of tensiometer is satisfactory, it is impractical in use and during transport, since always two parts have to be handled, and before transport, the mercury has to be emptied from the narrow tube which has to be refilled before use.

The other kind of tensiometer in general use comprises likewise a porosity cup which is fixed to the bottom of an elongated tubular transparent housing, in which the mercury manometer, constituted by a U-shaped narrow transparent tube is disposed. The housing is filled with water and is closed at its top, one leg of said tube extending through the closure means of the housing and being open to the atmosphere. The other leg of said tube is shorter and is open so that it is exposed to the water in the housing.

The construction of this tensiometer is satisfactory both from the scientific point of view and in its handling. However, during transport, when the tensiometer may be tilted, the mercury may run out from the manometer.

SUMMARY OF THE INVENTION

It has now been found that by using a mercury barometer, i.e. a mercury manometer which is closed at one end inside a water filled tensiometer housing it is possible to provide a tensiometer which can be easily handled and can be transported in any position without impairing its scientific accuracy. More specifically it has been found that a soil moisture tensiometer comprising a tubular housing having a porous cup attached to the bottom thereof and a barometer disposed within said housing wherein the housing is adapted to be filled with water and closed and the barometer is adapted to indicate the moisture content of the soil surrounding said cup avoids the disadvantages of prior art devices.

BRIEF DESCRIPTION OF THE DRAWINGS

The invention is illustrated, by way of example only, in the accompanying drawings, in which.

Figure 1:
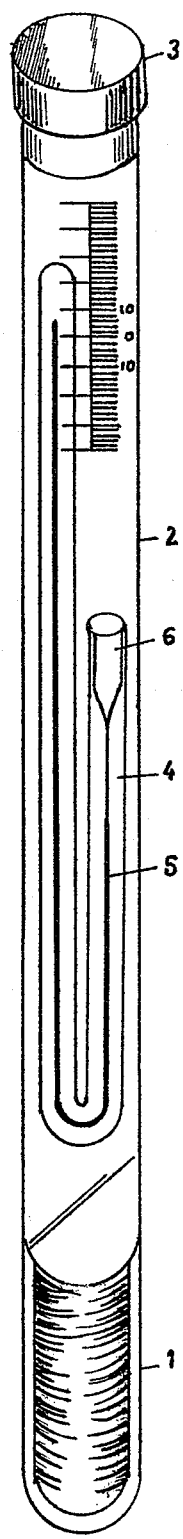
FIG. 1 shows an elevation of a tensiometer according to the invention.

The tensiometer according to the invention comprises a porous cup, as known per se, attached to the bottom of a tubular housing 2. Housing 2 may be of glass, transparent plastics or light-weight metal, in which case it will have to be provided along its wall with an elongated window covered by transparent means through which the interior of the housing 2 can be viewed from the outside. The top of housing 2 is filled with the distilled water and is covered by a rubber stopper 3 which seals the housing hermetically.

The wall of housing 2 is calibrated in centibars, as known per se. If desired the calibration may be made on any suitable means, i.e. an elongated rod which may be inserted into housing 2, or a strip pasted on the outside of the housing in such a manner that it is visible from the diametrically opposite side and, therefore, will be optically enlarged by the water.

The illustrated barometer comprises a thin U-shaped tube 4 of glass or plastics in which the known capillary 5, partially filled with mercury, is disposed. The long leg of tube 4 which is, as known per se, at least of a length in centibars corresponding to the prevailing atmospheric pressure, i.e. at least 760 mm., is preferably longer to allow operation at different atmospheric pressure, and is closed at the top either by the insertion of a stopper (not shown) or by welding the material of the tube itself, i.e. the glass or plastics. The shorter leg of tube 4 is open to the interior of the housing and may be of the same diameter throughout. It is filled with more mercury than necessary for ordinary use, in order to prevent water from entering the longer tube during transport or handling in horizontal position. As a feature according to the invention, it has an enlarged open end as shown at 6. This is provided as a safety measure and will always be filled with water and thus prevent air from entering the capillary 5 in case water from the housing 2 should escape through cup 1 to such an extent that its level will be below the mouth of the short leg of tube 4.

If desired, the calibration may be effected on the tube 4 itself.

Figure 2:
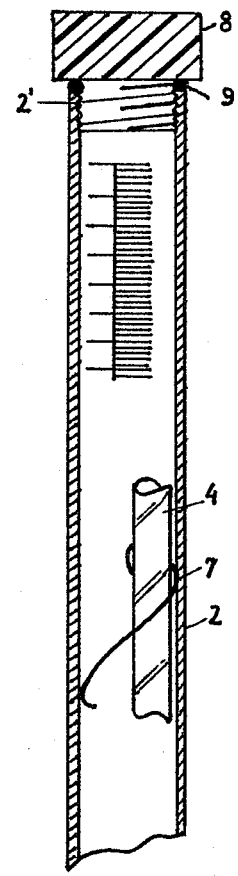
FIG. 2 shows a manometer retaining means and a second embodiment of the housing closing means.

In a preferred embodiment of the invention, which is illustrated in FIG. 2, one or more springy clamps 7 may be disposed in housing 2 to support tube 4 therein, the springiness of the clamps holding them against the inside surface of the housing. This makes it possible to raise or lower tube 4 while still holding it securely within the housing, to adjust its 0 reading to the prevailing atmospheric pressure, i.e. in order to obtain absolutely correct reading with the tensiometer, it must be adjusted before use to the atmospheric pressure of the location at which the reading is to be effected. The springs are placed in such position that the longer leg of tube 4 lies against the calibration, for easier reading. Instead of springs other calibration means could also be used such as an arrangement for moving the calibration scale instead of the manometer itself.

Figure 3:
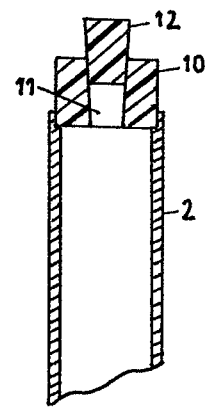
FIG. 3 shows a third embodiment of the housing closing means in axial section.

The housing 2 is preferably sealed hermetically to prevent the entry of air, since air within the tube causes a time lag in the reaction of the manometer and thus in the correct reading. In the embodiment of the cover of housing 2 a rigid plastic, rigid PVC, metal, or any other screw cap 8 with the interposition of an O-ring 9 is inserted by screwing into the internally threaded top end 2' of housing 2. This type of screw cap prevents the exertion of pressure on the water inside the tube. In the embodiment of FIG. 3, a rubber stopper 10 is provided to close the top of housing 2. Stopper 10 has a through-going bore 11 closed at the top by a small stopper 12. If desired, the screwcap 8 of FIG. 2 may be provided with a bore closed by a stopper. This embodiment facilitates the filling of water into the housing. Of course any other suitable closure may also be used.

The longer leg of tube 4 can be extended so that it is possible to use the tensiometer as a piezometer, i.e. to indicate positive pressure. In this case the calibration must be adjusted accordingly, i.e. to show positive reading above the zero point of the negative pressure readings.

DESCRIPTION OF PREFERRED EMBODIMENTS

While both U-shaped and straight barometers may be used a preferred embodiment of the present invention comprises a U-shaped narrow tube barometer having a capillary partially filled with mercury disposed within the housing, its longer leg being sealed at its top, while the shorter leg is open to the interior of the housing.

In this preferred embodiment it is especially preferred that the top end of the shorter leg of said tube is of enlarged internal diameter.

In still another preferred embodiment of the invention, the position of the U-shaped tube is adapted to be adjustable within the housing, thus providing a tensiometer which is easily adjustable to the atmospheric conditions of any location, i.e. to variations of atmospheric pressure due to geographical locations.

It will be evident to those skilled in the art that the invention is not limited to the details of the foregoing illustrative embodiments and that the present invention may be embodied in other specific forms without departing from the spirit or essential attributes thereof, and it is therefore desired that the present embodiments be considered in all respects as illustrative and not restrictive, reference being made to the appended claims, rather than to the foregoing description, in which it is intended to claim all modifications coming within the scope and spirit of the invention.

What is claimed is:

1. An improved soil moisture tensiometer comprising a tubular housing having a porous cup attached to the bottom thereof and a U-shaped narrow tube mercury barometer disposed within said housing, wherein the housing is provided with a removable closure for the upper end thereof and is adapted to be filled with water and closed by said closure and the barometer has a shorter leg open to the interior of said housing and a longer leg associated with a calibrated scale and sealed at its top, which leg is characterized by the existence of a vacuum between said sealed end and the mercury contained therein; said tensiometer further comprising means enabling said barometer and calibrated scale to be in moveable relationship to each other, whereby said barometer is adapted to indicate the moisture content of the soil surrounding said cup after said barometer and said scale have been adjusted relative to each other in accordance with the atmospheric conditions prevelant at the location at which the tensiometer reading is to be effected.

* * * * *